(12) United States Patent
Eguchi et al.

(10) Patent No.: US 8,960,400 B2
(45) Date of Patent: Feb. 24, 2015

(54) CLUTCH OPERATING DEVICE

(75) Inventors: Yasuhiko Eguchi, Yao (JP); Hiroaki Kato, Neyagawa (JP)

(73) Assignee: EXEDY Corporation, Osaka (JP)

( * ) Notice: Subject to any disclaimer, the term of this patent is extended or adjusted under 35 U.S.C. 154(b) by 172 days.

(21) Appl. No.: 13/807,514

(22) PCT Filed: Jun. 14, 2011

(86) PCT No.: PCT/JP2011/063599
§ 371 (c)(1),
(2), (4) Date: Dec. 28, 2012

(87) PCT Pub. No.: WO2012/005091
PCT Pub. Date: Jan. 12, 2012

(65) Prior Publication Data
US 2013/0112525 A1    May 9, 2013

(30) Foreign Application Priority Data
Jul. 7, 2010    (JP) ................ 2010-155075

(51) Int. Cl.
*F16D 28/00*    (2006.01)
*F16D 23/12*    (2006.01)

(52) U.S. Cl.
CPC ............... *F16D 23/12* (2013.01); *F16D 28/00* (2013.01)
USPC .............. 192/84.6; 192/84.7; 192/99 S

(58) Field of Classification Search
CPC .............. F16D 2500/1023; F16D 2500/1025; F16D 2500/1045
USPC .................................................. 192/84.6
See application file for complete search history.

(56) References Cited

U.S. PATENT DOCUMENTS

| 2004/0188218 | A1* | 9/2004 | Berger et al. ............ 192/90 |
| 2004/0238311 | A1* | 12/2004 | Parigger ............ 192/84.6 |
| 2008/0277224 | A1* | 11/2008 | Kiessner-Haiden ......... 192/3.22 |

FOREIGN PATENT DOCUMENTS

| GB | 2313885 A | 12/1997 |
| JP | S61-130628 A | 6/1986 |
| JP | H08-061392 A | 3/1996 |
| JP | 2004-116689 A | 4/2004 |
| JP | 2006-71070 A | 3/2006 |
| JP | 2008-43992 A | 2/2008 |
| JP | 2009-264512 A | 11/2009 |
| JP | 2011-052789 A | 3/2011 |
| JP | 2011-052790 A | 3/2011 |

* cited by examiner

*Primary Examiner* — Richard Lorence
(74) *Attorney, Agent, or Firm* — Global IP Counselors, LLP

(57) ABSTRACT

A clutch operating device includes a drive mechanism and a reduction mechanism. The drive mechanism generates a driving force. The reduction mechanism is a mechanism configured to amplify the driving force by reducing the driving amount to be inputted thereto from the reduction mechanism and convert the amplified driving force into an operating force of a clutch device. The reduction mechanism has a reduction ratio characteristic gradually increasing from a power blocking state to a power transmitting state of the clutch device and is allowed to adjust the reduction ratio characteristic in accordance with a state of the clutch device.

6 Claims, 7 Drawing Sheets

CLUTCH OPERATING DEVICE

CROSS-REFERENCE TO THE RELATED APPLICATIONS

This U.S. national phase application claims priority to Japanese Patent Application No. 2010-155075 filed on Jul. 7, 2010. The entire disclosure of Japanese Patent Application No. 2010-155075 is hereby incorporated herein by reference.

BACKGROUND

1. Technical Field

The present invention relates to a clutch operating device for operating a clutch device.

2. Background Art

In conventional manual transmissions, a clutch device is disposed between an engine and a transmission, while a shift lever of a driver's seat and the transmission are mechanically coupled through a link mechanism such as a control rod. In gear shifting, the shift lever is operated while a clutch pedal is pressed down for causing the clutch device to block transmission of power to be executed between the engine and the transmission. Therefore, when gear shifting is frequently required, a series of operations become a large burden on a driver.

In view of the above, to reduce a driver's burden regarding a shift operation, automatic transmissions, which is provided with a clutch actuator automatically coupling/decoupling a clutch device, have been proposed whereby a gear shifting operation can be executed without pressing down a clutch pedal.

CITATION LIST

Patent Literature

PTL 1: Specification of U.K. Patent Application Publication No. 2313885

SUMMARY

Normal closed type clutch devices are generally used as clutch devices for the aforementioned automatic transmissions. However, automatic transmissions using a normal open type clutch device have also been developed in recent years.

In the case of the normal open type, the clutch device is decoupled while operating force is not being applied to the clutch device from a clutch operating device. In coupling the clutch device, a pressure plate is pressed by a drive mechanism through a lever and a clutch disc is interposed between the pressure plate and a flywheel. As a result, power is transmitted to an input shaft of a transmission through the clutch disc.

With such structure, unlike the normal close type, in the normal open type clutch device, the pressing force acting on the clutch disc (clutch load) depends on the operating force to be transmitted thereto from the clutch operating device.

On the other hand, a clutch load characteristic can vary due to individual differences among clutch device products, and thereby, a relation between the clutch load and the operating force can vary among products. Therefore, a case can be also assumed that the load of a drive source of the clutch operating device also varies due to individual differences among products, and as a result, the load of the drive source is increased more than expected.

In Patent Literature 1, an assist mechanism is proposed that uses a cam for reducing a driving load.

However, the art described in Patent Literature 1 cannot cope with such individual differences among products.

It is an advantage of the present invention to provide a clutch operating device whereby it is possible to reduce increase in load attributed to individual differences among clutch device products.

A clutch operating device according to the present invention is a device for operating a clutch device and includes a drive part and a reduction part. The drive part is configured to generate a driving force. The reduction part is a mechanism configured to amplify the driving force by reducing a driving amount inputted thereto from the drive part and convert the amplified driving force into an operational force of the clutch device. The reduction part has a reduction ratio characteristic gradually increasing from a power blocking state to a power transmitting state of the clutch device. The reduction part is allowed to adjust the reduction ratio characteristic in accordance with a state of the clutch device.

Here, "a state of the clutch device" is a concept encompassing variation in a clutch load characteristic attributed to individual differences among products, and in some cases, could encompass variation in a clutch load characteristic attributed to variation with aging.

Further, "a reduction ratio" refers to a value obtained by dividing an input driving amount to be inputted into the reduction part from the drive part by an output driving amount to be outputted from the reduction part. "A reduction ratio characteristic" means a relation between the output driving amount and the reduction ratio and can be expressed with a single line on a chart. Therefore, "adjust the reduction ratio characteristic" means changing the relation between the output driving amount and the reduction ratio, and thus means changing the shape of the line on the chart.

In the present clutch operating device, the reduction part is allowed to adjust the reduction ratio characteristic in accordance with a state of the clutch device. Therefore, increase in a load of the drive part can be reduced even when the clutch load characteristic of the clutch device varies due to individual differences among products.

As explained above, in the present clutch operating device, the reduction part is allowed to adjust the reduction ratio characteristic in accordance with a state of the clutch device. Therefore, increase in a load of the drive part can be reduced even when the clutch load characteristic of the clutch device varies due to individual differences among products. Therefore, according to the present clutch operating device, it is possible to reduce increase in a load attributed to individual differences among clutch device products.

DETAILED DESCRIPTION OF THE PREFERRED EMBODIMENTS

<Structure of Clutch Device>

Figure 1:
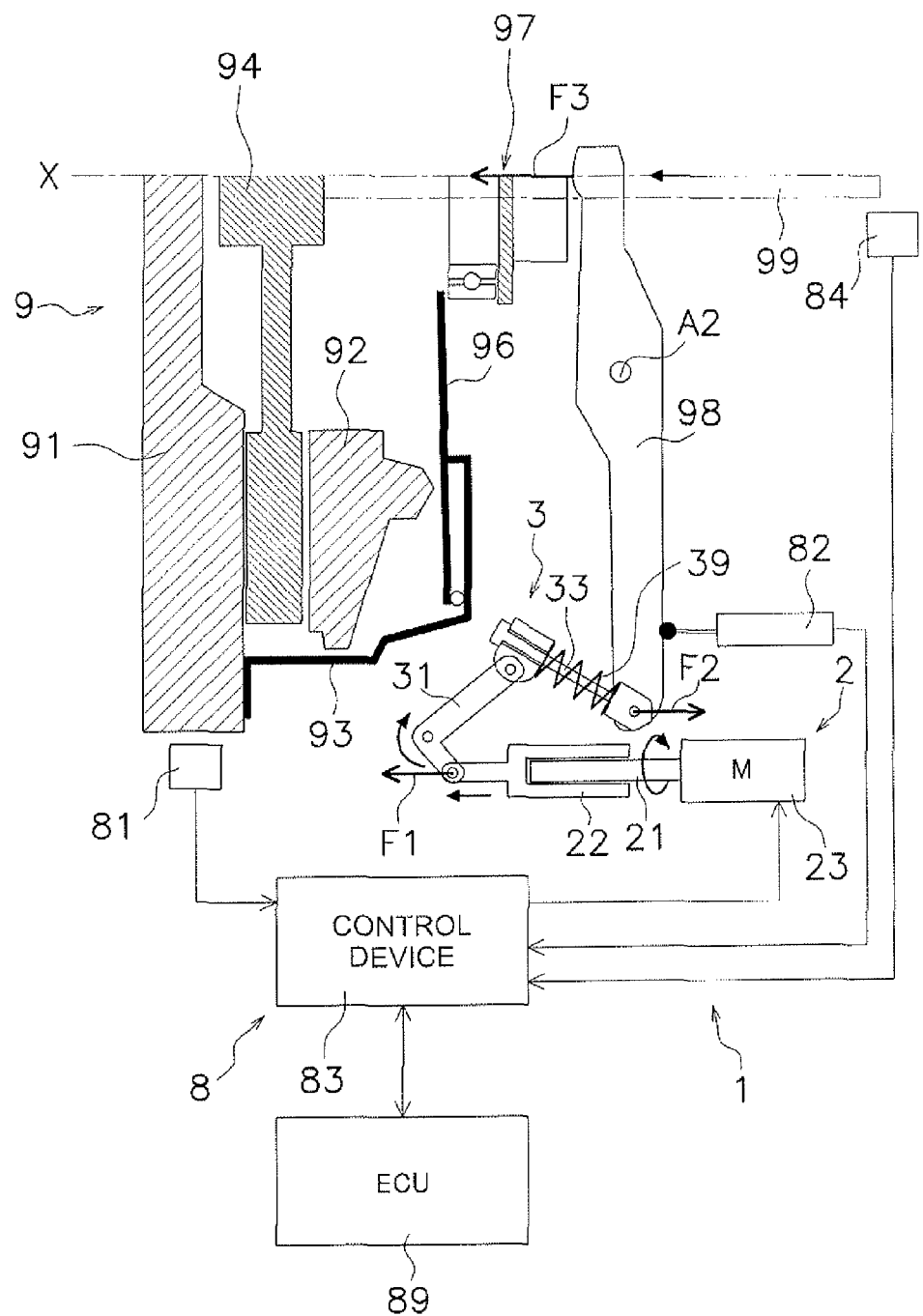
FIG. 1 is a schematic structural diagram of a clutch device and a clutch operating device (power blocking state).

As illustrated in FIG. 1, a clutch device 9 is an exemplary device for transmitting power from an engine (not illustrated in the figure) to a transmission (not illustrated in the figure) and is, for instance, fixed to a flywheel 91 of the engine. The clutch device 9 is so-called a normal open type device. While operational force is not being applied to the clutch device 9 from a clutch operating device 1 (to be described), power is blocked from being transmitted from the engine to the transmission. The clutch operating device 1 will be described below in detail.

As illustrated in FIG. 1, the clutch device 9 includes a clutch cover 93, a pressure plate 92, a clutch disc 94, a pressure lever 96, an engaging bearing 97, and a clutch lever 98.

The clutch cover 93 is fixed to the flywheel 91. The pressure plate 92 is supported by the clutch cover 93 while being unitarily rotatable therewith and axially movable. The pressure plate 92 is coupled to the clutch cover 93 by a plurality of strap plates (not illustrated in the figures) while being unitarily rotatable therewith. Further, the pressure plate 92 is elastically coupled to the clutch cover 93 in the axial direction by the strap plates.

The clutch disc 94 is disposed between the flywheel 91 and the pressure plate 92, and is interposed axially between the flywheel 91 and the pressure plate 92 when the clutch device 9 is coupled. The clutch disc 94 has a cushioning plate. The pressure lever 96 is a roughly annular plate and is supported by the clutch cover 93 while being elastically deformable in the axial direction. The pressure lever 96 has small elastic force and relatively small force is required for elastically deforming the pressure lever 96. The inner peripheral part of the pressure lever 96 can be axially pressed inside by the engaging bearing 97.

The engaging bearing 97 absorbs a rotary difference between the clutch lever 98 and the pressure lever 96. When the clutch device 9 is coupled, the engaging bearing 97 axially presses the pressure plate 92 through the pressure lever 96. The engaging bearing 97 is axially driven by the clutch operating device 1 through the clutch lever 98. In the clutch device 9, the pressing force, which acts on the clutch disc 94 through the pressure lever 96 and the pressure plate 92, is configured to vary in accordance with the displacement of the engaging bearing 97 (the operating amount of the clutch operating device 1). The clutch lever 98 is rotatably supported by a housing (not illustrated in the figures).

<Structure of Clutch Operating Device>

The clutch operating device 1 is a device for operating the clutch device 9 and switches the clutch device 9 into either a power transmitting state or a power blocking state, for instance, based on an operating signal to be outputted from a transmission ECU 89. Here, the power blocking state means a state that transmission of power through the clutch device 9 is being completely blocked, whereas the power transmitting state means a state that transmission of power through the clutch device 9 is being executed. In the power transmitting state, the rotational speed of the flywheel 91 and that of an input shaft 99 of the transmission are the same.

The clutch operating device 1 can be applied to a variety of clutch devices with different specifications. However, the clutch operating device 1 will be herein explained by exemplifying the aforementioned clutch device 9 as an operating target of the clutch operating device 1.

Figure 2:
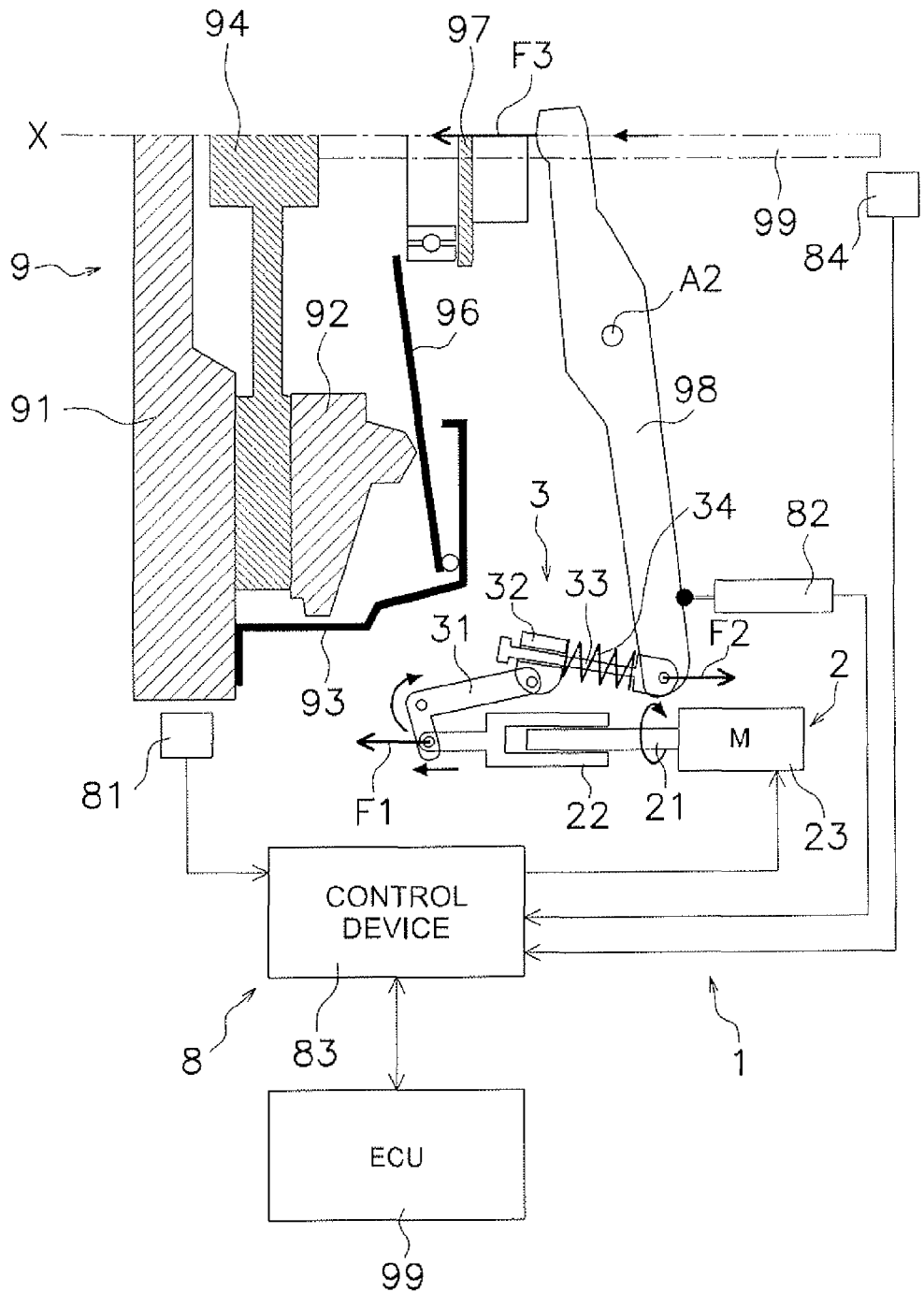
FIG. 2 is a schematic structural diagram of the clutch device and the clutch operating device (power transmitting state).

As illustrated in FIGS. 1 and 2, the clutch operating device 1 includes a drive mechanism 2 (an exemplary drive part), a reduction mechanism 3 (an exemplary reduction part) and a control unit 8.

The drive mechanism 2 is a drive source for driving the clutch lever 98 of the clutch device 9 and applies thrust to the clutch lever 98 through the reduction mechanism 3. Here, the force to be inputted into the reduction mechanism 3 from the drive mechanism 2 is defined as a driving force F1 (exemplary driving force of the drive part), while the force to be outputted from the reduction mechanism 3 is defined as an operating force F2 (exemplary operating force of the clutch device). The driving force F1 and the operating force F2 vary in accordance with the force required in the clutch device 9.

The drive mechanism 2 generates the driving force F1 for driving the clutch device 9. Specifically, the drive mechanism 2 includes a drive motor 23 and a ball screw 22. The drive motor 23 is a brushless motor, for instance, and includes a drive shaft 21 for outputting rotary driving force. The ball screw 22 converts the rotary motion of the drive shaft 21 into a linear motion. A male thread is formed on the drive shaft 21, while a female thread is formed in the ball screw 22. The drive shaft 21 is screwed into the ball screw 22. When the drive shaft 21 is rotated, the ball screw 22 is axially moved. Accordingly, the rotary driving force, which is generated in the drive motor 23, is converted into the axial driving force F1. The driving force F1 is transmitting to the reduction mechanism 3 through the ball screw 22.

The reduction mechanism 3 converts the driving force F1 generated in the drive mechanism 2 into the operating force F2. When explained in more detail, the reduction mechanism 3 converts the driving force F1 into the operating force F2 of the clutch device 9 by amplifying the driving force F1 through reduction of the driving amount (the stroke of the ball screw 22) to be inputted thereto from the drive mechanism 2. So-called a principle of a toggle mechanism is applied to the reduction mechanism 3, and the reduction mechanism 3 has a reduction ratio characteristic that a reducing ratio is gradually increased from the power blocking state (see FIG. 1) to the power transmitting state (see FIG. 2) of the clutch device 9. The reduction mechanism 3 will be described below in detail.

The control unit 8 includes a control device 83, a first rotation sensor 81, a second rotation sensor 84, and a stroke sensor 82. The control device 83 controls the drive motor 23 in accordance with a state of the vehicle. Specifically, the control device 83 controls the drive motor 23 based on an operating signal to be outputted from the transmission ECU 89 (see FIG. 1).

The first rotation sensor 81 detects the rotational speed of the flywheel 91. The second rotation sensor 84 detects the rotational speed of the input shaft 99 unitarily rotated with the clutch disc 94. The stroke sensor 82 detects a stroke S (an absolute position) of the clutch lever 98. The control device 83 is electrically connected to the first rotation sensor 81, the second rotation sensor 84, and the stroke sensor 82. The detection signals of the first rotation sensor 81, the second rotation sensor 84 and the stroke sensor 82 are inputted into the control device 83 at predetermined periods. The control device 83 controls the action of the drive motor 23 using the respective detection signals.

For example, in clutch releasing, when receiving an operating signal to be outputted from the transmission ECU 89, the control device 83 controls the driving of the drive motor 23 so that the clutch lever 98 is rotated to a predetermined release position. The control device 83 determines whether or not the clutch lever 98 is located in a predetermined position based on the detection signal of the stroke sensor 82.

On the other hand, in clutch coupling, the control device 83 controls the driving of the drive motor 23 so that the clutch lever 98 is rotated to an engaging position. In the present exemplary embodiment, the engaging position of the clutch lever 98 is determined based on whether or not the rotational speed of the flywheel 91 and that of the input shaft 99 are equivalent to each other. When explained in more detail, the rotational speed of the flywheel 91 and that of the input shaft 99 are determined based on the detection signal of the first rotation sensor 81 and that of the second rotation sensor 84.

<Actions of Clutch Operating Device>

Here, the action of the clutch operating device 1 will be briefly explained.

In the power blocking state illustrated in FIG. 1, the driving force to be generated in the clutch operating device 1 is not being transmitted to the engaging bearing 97. The pressure plate 92 is thereby held in a position away from the clutch disc 94 by the elastic force of the strap plates. Therefore, the rotation of the flywheel 91 is not transmitted to the clutch disc 94, and a gear shifting action is enabled in the transmission.

In switching the clutch device 9 from the power blocking state to the power transmitting state, the drive motor 23 drives the clutch lever 98 based on a control signal of the control device 83. Specifically, the drive shaft 21 of the drive motor 23 starts being rotated and the ball screw 22 is moved for pressing a first link member 31. When a first end 31a of the first link member 31 is pressed by the ball screw 22, the first link member 31 is rotated about a rotary axis A1. As a result, the driving force of the drive motor 23 is transmitted to the clutch lever 98 through a second link member 32, a coil spring 34, and a third link member 33.

The driving amount of the drive mechanism 2 (either the rotary amount of the drive shaft 21 or the stroke of the ball screw 22) is reduced and converted into the stroke S by the reduction mechanism 3. Further, the driving force F1 generated by the drive mechanism 2 is amplified by the reduction mechanism 3, and is converted into the operating force F2. The clutch lever 98 is driven by the amount of the stroke S by the operating force F2 to be outputted from the reduction mechanism 3. Actually, the operating force F2 varies in accordance with the state of the clutch device 9, and accordingly, the driving force F1 also varies. In other words, the operating force F2 and the driving force F1 vary in accordance with the state of the clutch device 9 and that of the reduction mechanism 3.

When pressed by the reduction mechanism 3 and rotated about a rotary axis S2, the clutch lever 98 presses the engaging bearing 97 towards the flywheel 91. As a result, the pressure plate 92 is pressed towards the flywheel 91 through the pressure lever 96, and the clutch disc 94 is pressed onto the flywheel 91 by the pressure plate 92. The clutch device 9 is driven by the clutch operating device 1 until the rotational speed of the input shaft 99 becomes equal to that of the flywheel 91. When the both rotational speeds become equal to each other, the drive motor 23 is stopped by the control device 83. As a result, the clutch disc 94 is interposed between the pressure plate 92 and the flywheel 91, and power is transmitted from the engine to the transmission through the clutch disc 94.

On the other hand, driving in the drive motor 23 is continued until the stroke S becomes its initial value in switching the clutch device 9 from the power transmitting state to the power blocking state. When the stroke S to be detected by the stroke sensor 82 becomes its initial value, the drive motor 23 is stopped by the control device 83.

<Detailed Structure of Reduction Mechanism>

Figure 3:
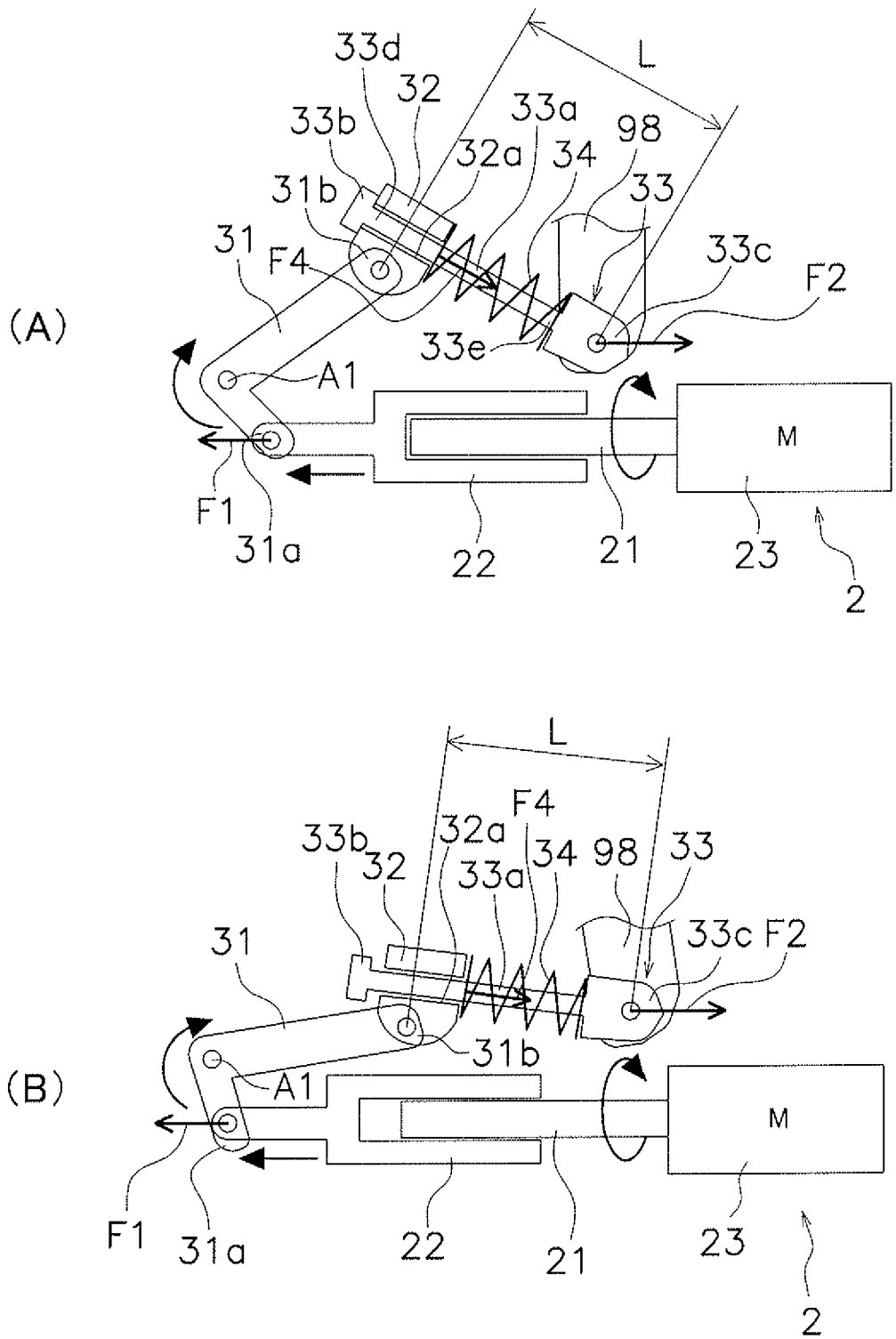
FIG. 3 is a structural diagram of a reduction mechanism.

The reduction mechanism 3 has a function of automatically adjusting the reduction ratio characteristic in accordance with the state of the clutch device 9. To implement the function, as illustrated in FIGS. 3(A) and 3(B), the reduction mechanism 3 includes the first link member 31, the second link member 32, the third link member 33, and the coil spring 34 (an exemplary elastic member).

The first link member 31 is supported by the housing (not illustrated in the figures) while being rotatable about the rotary axis A1. The first link member 31 is driven and rotated by the drive mechanism 2. In the present exemplary embodiment, the first link member 31 is bent in an L-shape. The first end 31a of the first link member 31 is rotatably coupled to an end of the ball screw 22 through a pin. A second end 31b of the first link member 31 is rotatably coupled to the second link member 32 through a pin.

The second link member 32 is rotatably coupled to the second end 31b of the first link member 31. The second link member 32 has a slide aperture 32a. The third link member 33 is inserted into the slide aperture 32a.

The third link member 33 is disposed slidably with the second link member 32 while being coupled to the clutch lever 98. Specifically, the third link member 33 has a rod-shaped shaft portion 33a, a columnar stopper portion 33b, and a coupling portion 33c. The shaft portion 33a is inserted into the slide aperture 32a of the second link member 32, and is longer than the second link member 32. The shaft portion 33a is inserted into the slide aperture 32a, and therefore, the second link member 32 is allowed to be moved along the shaft portion 33a.

The stopper portion 33b is formed in a first end 33d of the shaft portion 33a, and is disposed while being allowed to make contact with the second link member 32. The outer diameter of the stopper portion 33b is greater than that of the shaft portion 33a, and is further, greater than the inner diameter of the slide aperture 32a. As illustrated in FIG. 3(A), the second link member 32 is positioned by the stopper portion 33b in the initial state of the reduction mechanism 3.

The coupling portion 33c is formed in a second end 33e of the shaft portion 33a. The coupling portion 33c is rotatably coupled to an end of the clutch lever 98 through a pin. The coupling portion 33c has a contour size that is roughly the same as that of the stopper portion 33b.

The coil spring 34 is disposed on a power transmission path produced from the drive mechanism 2 to the clutch device 9, and is disposed between the second link member 32 and the third link member 33 while being preliminarily compressed therebetween. When explained in more detail, the coil spring 34 is disposed between the second link member 32 and the coupling portion 33c while being preliminarily compressed therebetween. The shaft portion 33a is inserted into the coil spring 34. While the second link member 32 makes contact with the stopper portion 33b, the coil spring 34 is compressed between the second link member 32 and the coupling portion 33c. In other words, in the initial state illustrated in FIG. 3(A), the second link member 32 is pressed onto the stopper portion 33b of the third link member 33 by the coil spring 34. As illustrated in FIG. 3(B), compression of the coil spring 34 is started when a load exceeding an initial compression load Fi acts thereon. The compression of the coil spring 34 is stopped in a position where a force F4 acting on the coil spring 34 and the elastic force of the coil spring 34 are balanced.

Figure 4:
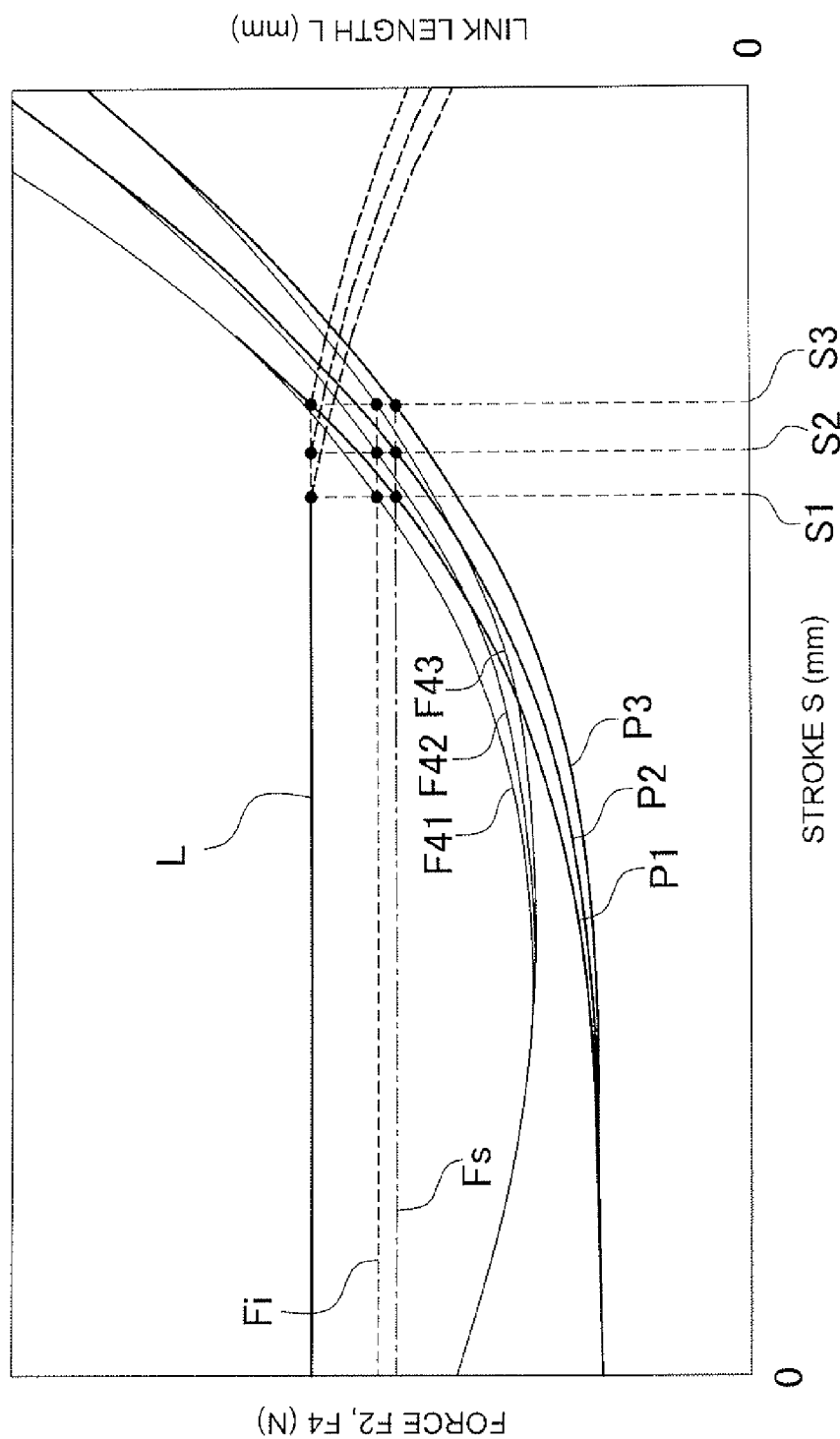
FIG. 4 is a chart representing a relation among stroke, reference operating force and link length.

The action of the coil spring 34 will be herein explained using FIG. 4. In FIG. 4, a first vertical axis indicates the operating force F2 and the force F4 acting on the coil spring 34; a second vertical axis indicates a link length L; and a horizontal axis indicates the output side stroke S of the reduction mechanism 3. The link length L is a length represented in FIGS. 3(A) and 3(B). The displacement of the link length L corresponds to that of the length (compressional displacement) of the coil spring 34.

As represented in FIG. 4, at the time of product shipping (i.e., where the clutch disc 94 has not been abraded), the relation between the operating force F2 and the stroke S is as represented by a first clutch load characteristic P1. On the other hand, where the clutch disc 94 is abraded to the maximally allowable abraded amount, the relation between the operating force F2 and the stroke S is as represented by a third clutch load characteristic P3. An intermediate characteristic between the first clutch load characteristic P1 and the third clutch load characteristic P3 can be expressed by a second clutch load characteristic P2. In any of the cases, it is apparent that the required operating force F2 is gradually increased in proportion to increase in the stroke S.

On the other hand, in the condition that the stroke S is short (closer to zero), the reduction ratio of the reduction mechanism 3 is small, and therefore, the force F4 acting on the coil spring 34 will be relatively large. In proportion to increase in the stroke S, the reduction ratio of the reduction mechanism 3 is gradually increased. Therefore, the force F4 acting on the coil spring 34 is once reduced and then gradually increased. In the condition that the stroke S is long, an angle θ formed by the first link member 31 and the third link member 33 gets closer to 180 degrees, and the operating force F2 becomes roughly equivalent to the force F4 acting on the coil spring 34. Therefore, as represented in FIG. 4, the curve of the force F4 gets closer to the curve of the operating force F2 in proportion to increase in the stroke S, and finally, the both curves are supposed to make contact with each other.

For example, in the case of the first clutch load characteristic P1, a curve F41 of the force F4 gradually gets closer to the curve of the first clutch load characteristic P1 in proportion to increase in the stroke S. In the case of the second clutch load characteristic P2, a curve F42 of the force F4 gradually gets closer to the curve of the second clutch load characteristic P2 in proportion to increase in the stroke S. In the case of the third clutch load characteristic P3, a curve F43 of the force F4 gradually gets closer to the curve of the third clutch load characteristic P3 in proportion to increase in the stroke S.

The curves of the force F4 and the operating force F2 represented in FIG. 4 indicate the case that the coil spring 34 keeps its initial compressed state. However, when the force F4 actually exceeds the initial compression load Fi, compression of the coil spring 34 progresses in accordance with the magnitude of the force F4, and the link length L is reduced in accordance with the force F4 as represented in FIG. 4.

Specifically, as represented in FIG. 4, in the case of the first clutch load characteristic P1, the force F4 reaches the initial compression load Fi in a stroke S1, and therefore, compression of the coil spring 34 progresses and the link length L begins to be reduced in the stroke S1. In the case of the second clutch load characteristic P2, the force F4 reaches the initial compression load Fi in a stoke S2, and therefore, the link length L begins to be reduced in the stroke S2. Further, in the case of the third clutch load characteristic P3, the force F9 reaches the initial compression load Fi in a stroke S3, and therefore, the link length L begins to be reduced in the stroke S3. As represented in FIG. 9, in the present exemplary embodiment, the operating force F2 at the start of compression of the coil spring 34 is roughly constant even when the clutch load characteristic is changed. In the following explanation, the operating force F2 will be defined as an actuation start operating force Fs. It should be noted that the reduction mechanism 3 can be configured so that the actuation start operating force F2 is changed in accordance with the clutch load characteristic.

As described above, whether or not the coil spring 34 is actuated is determined by the force F4 and the initial compression load Fi. The force F4 is changed in accordance with the operating force F2 and the stroke S. Therefore, whether or not the coil spring 34 is actuated, and the compressional displacement of the coil spring 34, are determined by the relation between the operating force F2 and the stroke S. The relation between the operating force F2 and the stroke S represents how much extent the operating force F2 is required in a given stroke S. Therefore, it could be expressed that whether or not the coil spring 34 is actuated is determined based on the state of the clutch device 9.

<Reduction Ratio Characteristic of Reduction Mechanism>

Figure 5:
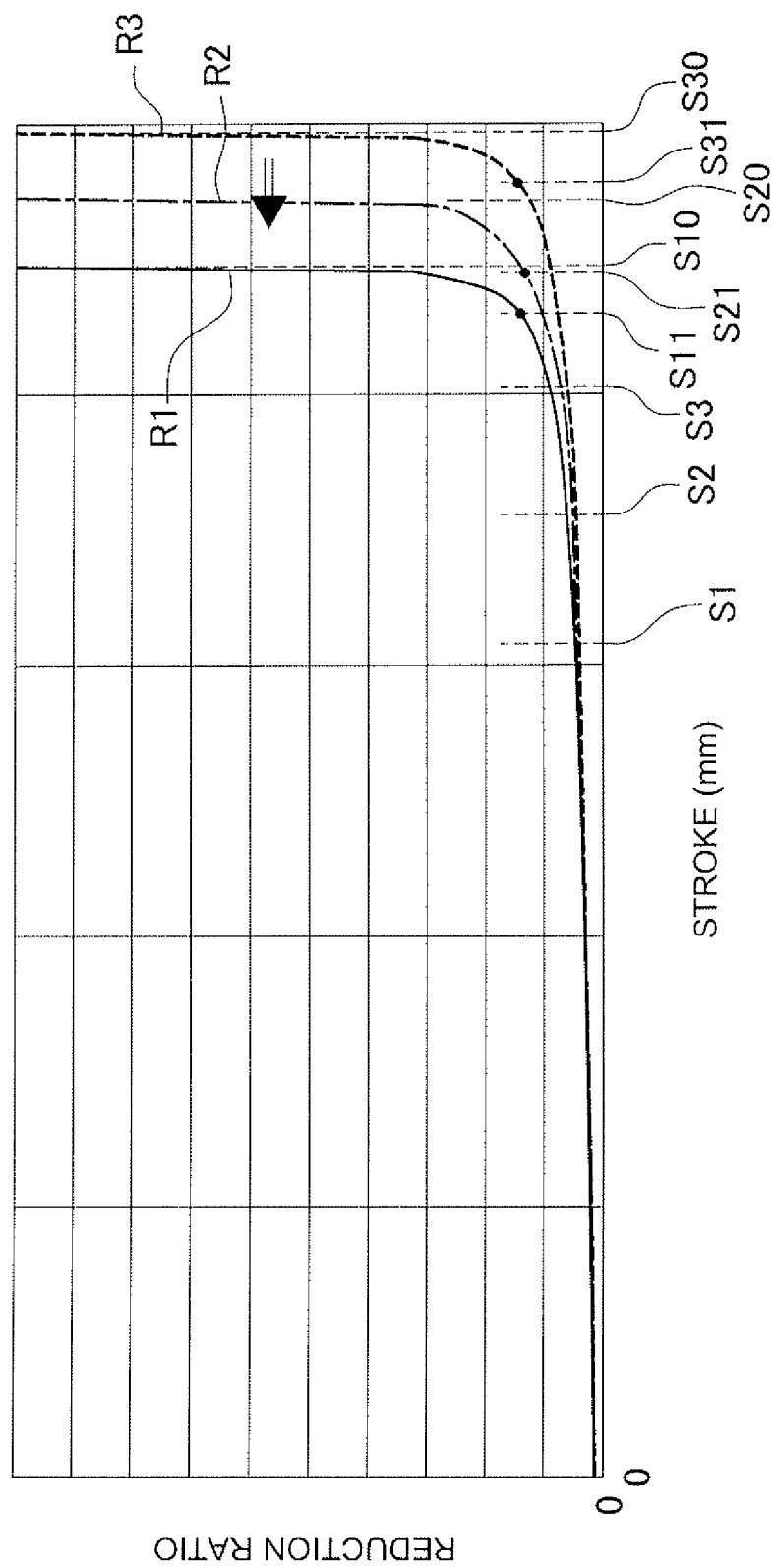
FIG. 5 is a reduction ratio characteristic diagram of the reduction mechanism.

The reduction mechanism 3 has the structure as described above, and therefore, the reduction ratio characteristic of the reduction mechanism 3 is changed in accordance with the operating force F2 and the stroke S. The reduction ratio characteristic of the reduction mechanism 3 will be herein explained in more detail. FIG. 5 represents the reduction ratio characteristic of the reduction mechanism 3. In the chart represented in FIG. 5, the vertical axis indicates the reduction ratio of the reduction mechanism 3, while the horizontal axis indicates the output side stroke S of the reduction mechanism 3. "The reduction ratio" herein refers to a value obtained by dividing the input driving amount (the stroke of the ball screw 22) to be inputted into the reduction mechanism 3 (the reduction part) from the drive mechanism 2 (the drive part) by the output driving amount (the stroke S) to be outputted from the reduction mechanism 3.

As represented in FIG. 5, the reduction mechanism 3 utilizes the principle of a toggle mechanism, and therefore, the reduction ratio of the reduction mechanism 3 is acutely increased at the terminal of the stroke S. In addition to this, the first link member 31 is coupled to the third link member 33 through the second link member 32 and the coil spring 34 without being directly coupled to the third link member 33 by a pin. Therefore, when the compressed state of the coil spring 34 is changed, fulcrum positions that the first link member 31 and the third link member 33 are coupled are changed and the reduction ratio characteristic is also changed accordingly. In short, the reduction ratio characteristic of the reduction mechanism 3 is continuously changed in accordance with the state of the clutch device 9.

For example, as represented in FIG. 5, a third reduction ratio characteristic R3 is a reduction ratio characteristic of the reduction mechanism 3 where the coil spring 34 continues to keep its initial compressed state. On the other hand, a first reduction ratio characteristic R1 is a reduction ratio characteristic where the compressed amount of the coil spring 34 is maximized. A second reduction ratio characteristic R2 is a reduction ratio characteristic of the reduction mechanism 3 where the coil spring 34 is compressed to some extent from its initial compressed state. Each of the reduction ratio characteristics indicates a case that the compressed amount of the coil spring 34 is constant even when the stroke S is changed. In actual situations, however, countless reduction ratio characteristics exist from the first reduction ratio characteristic R1 to the third reduction ratio characteristic R3. Further, the compressed state of the coil spring 34 is changed due to the operating force F2 and the stroke S during the actuation of the reduction mechanism 3, and the reduction ratio characteristic is continuously changed within a range from the first reduction ratio characteristic R1 to the third reduction ratio characteristic R3 during the action of the reduction mechanism 3.

<Relation Between Clutch Load Characteristic and Motor Torque>

By using the aforementioned reduction mechanism 3, in the clutch operating device 1, the reduction ratio characteristic is automatically adjusted in accordance with the state of the clutch device 9, and the motor torque of the drive motor 23 can be reduced. The relation between the clutch load characteristic and the motor torque will be hereinafter explained.

Figure 6:
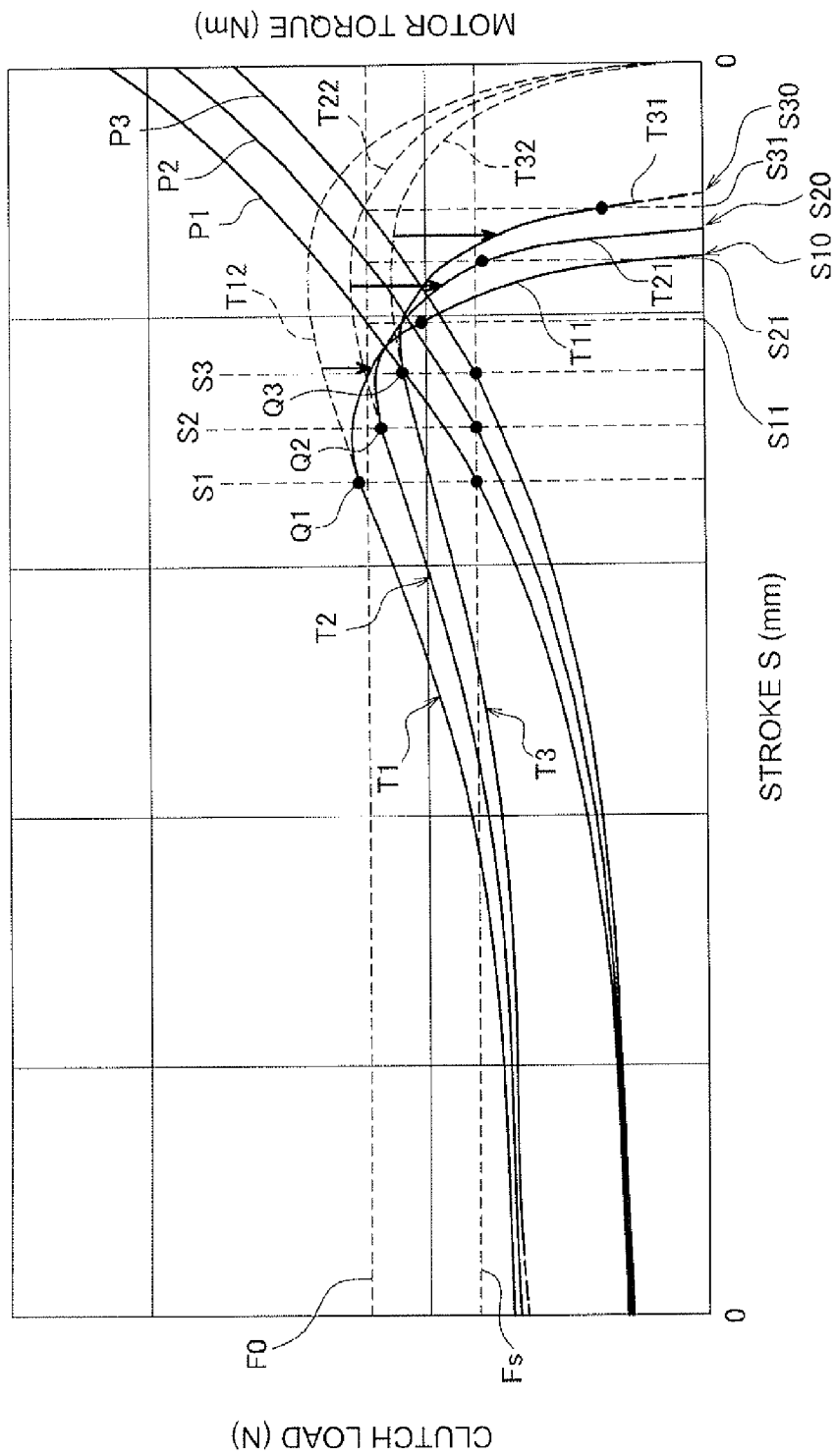
FIG. 6 is a chart representing a relation between clutch load characteristic and motor torque.

FIG. 6 represents the clutch load characteristic of the clutch device 9 and the motor torque. In FIG. 6, the first vertical axis indicates the clutch load of the clutch device 9 (in more detail, the operating force F2), while the second vertical axis represents the motor torque of the drive motor 23. Further, in FIG. 6, the horizontal axis indicates the stroke S of the clutch operating device 1.

First, the clutch load will be explained. The clutch load characteristic represented in FIG. 6 is changed in accordance with the state of the clutch device 9. The state of the clutch device 9 is changed in accordance with individual differences among products and degradation with aging. For example, abrasion of the clutch disc 94, degradation of the cushioning plate and etc. can be considered as degradation with aging.

For example, as represented in FIG. 6, the clutch disc 94 has not been abraded in the first clutch load characteristic P1. Therefore, a required clutch load F0 can be obtained even when the stroke S is short. Here, the clutch load F0 is the operating force F2 minimally required for keeping the clutch device 9 in the power transmitting state. Different strokes S are required for obtaining the clutch load F0 among the first to third clutch load characteristics P1 to P3. Specifically, as represented in FIG. 6, a stroke S11 is required for obtaining the clutch load F0 in the first clutch load characteristic P1, whereas a stroke S31, which is longer than the stroke S11, is required for obtaining the clutch load F0 in the third clutch load characteristic P3. Further, a stroke S21, which is longer than the stroke S11, is required for obtaining the clutch load F0 in the second clutch load characteristic P2.

On the other hand, as represented in FIG. 6, where the stroke S is short, a relatively large opening force F2 is required even though the reduction ratio of the reduction mechanism 3 is not large that much. Therefore, as depicted with a first motor torque T1 in FIG. 6, the motor torque of the drive motor 23 is inevitably increased when the toggle mechanism is just simply used (see e.g., a range depicted with a broken line T12).

However, as described above, the reduction ratio of the reduction mechanism 3 is automatically adjusted in accordance with the state of the clutch device 9. Therefore, increase in motor torque can be inhibited. Specifically, as represented in FIGS. 4 and 6, in the case of the first clutch load characteristic 91, when the stroke S reaches the stroke S1, the force F4 acting on the coil spring 34 reaches the initial compression load Fi. When the stroke S then gets longer than the stroke S1, the compression of the coil spring 34 progresses and the reduction ratio of the reduction mechanism 3 is gradually increased.

Specifically, as illustrated in FIGS. 3(A) and 3(B), when the coil spring 34 is further compressed from its initial compressed state, the second link member 32 is moved towards the coupling portion 33c along the shaft portion 33a. As a result, the reduction ratio characteristic of the reduction mechanism 3 is changed. For example, as represented in FIG. 5, the reduction ratio characteristic of the reduction mechanism 3 is shifted from the third reduction ratio characteristic R3 towards the first reduction ratio characteristic R1 in accordance with the compressed amount of the coil spring 34. In short, in the case of the first clutch load characteristic P1, the reduction ratio is increased relatively early from the stroke S1 corresponding to the actuation start operating force Fs. As a result, as depicted with a range T11 in FIG. 6, the motor torque of the drive motor 23 is gradually reduced from a first actuation point Q1 corresponding to the stroke S1.

On the other hand, when the abrasion of the clutch disc 94 progresses and the clutch load characteristic of the clutch device 9 is changed into the second clutch load characteristic P2, actuation of the coil spring 34 is not started even when the stroke S reaches the stroke S1. This is because, as represented in FIG. 4, the stroke S at the start of actuation of the coil spring 34 is changed in accordance with the clutch load characteristic.

For example, in the case of the second clutch load characteristic P2, when the stroke S becomes the stroke S2 that is longer than the stroke S1, the force F4 acting on the coil spring 34 reaches the initial compression load Fi. When the stroke S gets longer than the stroke S2, the force F4 acting on the coil spring 34 exceeds the initial compression load Fi and actuation of the coil spring 34 is started. As represented in FIG. 5, when the coil spring 34 is further compressed from its initial compressed state, the reduction ratio of the reduction mechanism 3 is increased relatively early in a similar manner to the aforementioned case of the first clutch load characteristic P1. When a reference operating force Fs2 and the elastic force of the coil spring 34 are balanced, compression of the coil spring 34 is stopped and change in the reduction ratio characteristic of the reduction mechanism 3 is also stopped. The reduction ratio of the reduction mechanism 3 is increased by the actuation of the coil spring 34. Therefore, the motor torque of the drive motor 23 is gradually reduced from a second actuation point Q2 corresponding to the stroke S2 as depicted with a range T21 in FIG. 6. It can be understood from FIG. 6 that the motor torque can be reduced compared to a motor torque T22 (broken line) where the reduction ratio characteristic is not adjusted.

Where the abrasion of the clutch disc 94 further progresses and the load characteristic of the clutch device 9 is changed into the third clutch load characteristic P3, the force F4 acting on the coil spring 34 reaches the initial compression load Fi when the stroke S reaches the stroke S3 in a similar manner to the aforementioned case. When the stroke S gets longer than the stroke S3, the force F4 acting on the coil spring 34 exceeds the initial compression load Fi and actuation of the coil spring 34 is started. As represented in FIG. 5, when the coil spring 34 is further compressed from its initial compressed state, the reduction ratio of the reduction mechanism 3 is increased relatively early in a similar manner to the aforementioned case of the first clutch load characteristic P1.

Specifically, as depicted with a range T31 in FIG. 6, the motor torque of the drive motor 23 is gradually reduced from a third actuation point Q3 corresponding to the stroke S3. It can be understood from FIG. 6 that the motor torque can be reduced compared to a motor torque T32 (broken line) where the reduction ratio characteristic is not adjusted.

<Features of Clutch Operating Device>

Thus, in the clutch operating device 1, the reduction ratio characteristic of the reduction mechanism 3 is automatically adjusted in accordance with the state of the clutch device 9 (in more detail, the relation between the operating force F2 and the stroke S). Therefore, it is possible to reduce increase in motor torque of the drive mechanism 2, which is attributed to individual differences among the clutch device 9 products.

The reduction ratio characteristic of the reduction mechanism 3 is automatically adjusted in accordance with the abrasion amount of the clutch disc 94, as well as individual differences among products. Therefore, it is also possible to reduce increase in load of the drive mechanism 2, which is attributed to the abrasion of the clutch disc 94.

Other Exemplary Embodiments

The specific structure of the present invention is not limited to that of the aforementioned exemplary embodiment, and a variety of changes and modifications can be herein made without departing from the scope of the present invention. It should be noted in the following explanation that the same reference numeral is used for an element having substantially the same function as a corresponding element in the aforementioned exemplary embodiment and the detailed explanation of the element will be hereinafter omitted.

(A) In the aforementioned exemplary embodiment, the clutch device 9 has been exemplified for explaining the clutch device. However, the structure of the clutch device is not limited to that of the aforementioned exemplary embodiment. As long as the clutch device is of a normal open type, the aforementioned technique can be applied thereto. For example, a twin clutch using two clutch discs can be assumed as the clutch device.

(B) In the aforementioned exemplary embodiment, the drive mechanism 2 has been exemplified for explaining the drive part. However, the elements of the drive part for generating driving force are not limited to the drive motor 23 and the ball screw 22. For example, other actuators such as a hydraulic cylinder can be employed as the drive part.

(C) In the aforementioned exemplary embodiment, the reduction mechanism 3 has been exemplified for explaining the reduction part. However, the structure of the reduction part is not limited to the aforementioned reduction mechanism 3. The reduction part can employ a different structure as long as it is a mechanism whereby a reduction ratio characteristic can be adjusted in accordance with the state of the clutch device. Modifications of the reduction part will be hereinafter explained using FIGS. 7(A) to 7(C).

Figure 7:
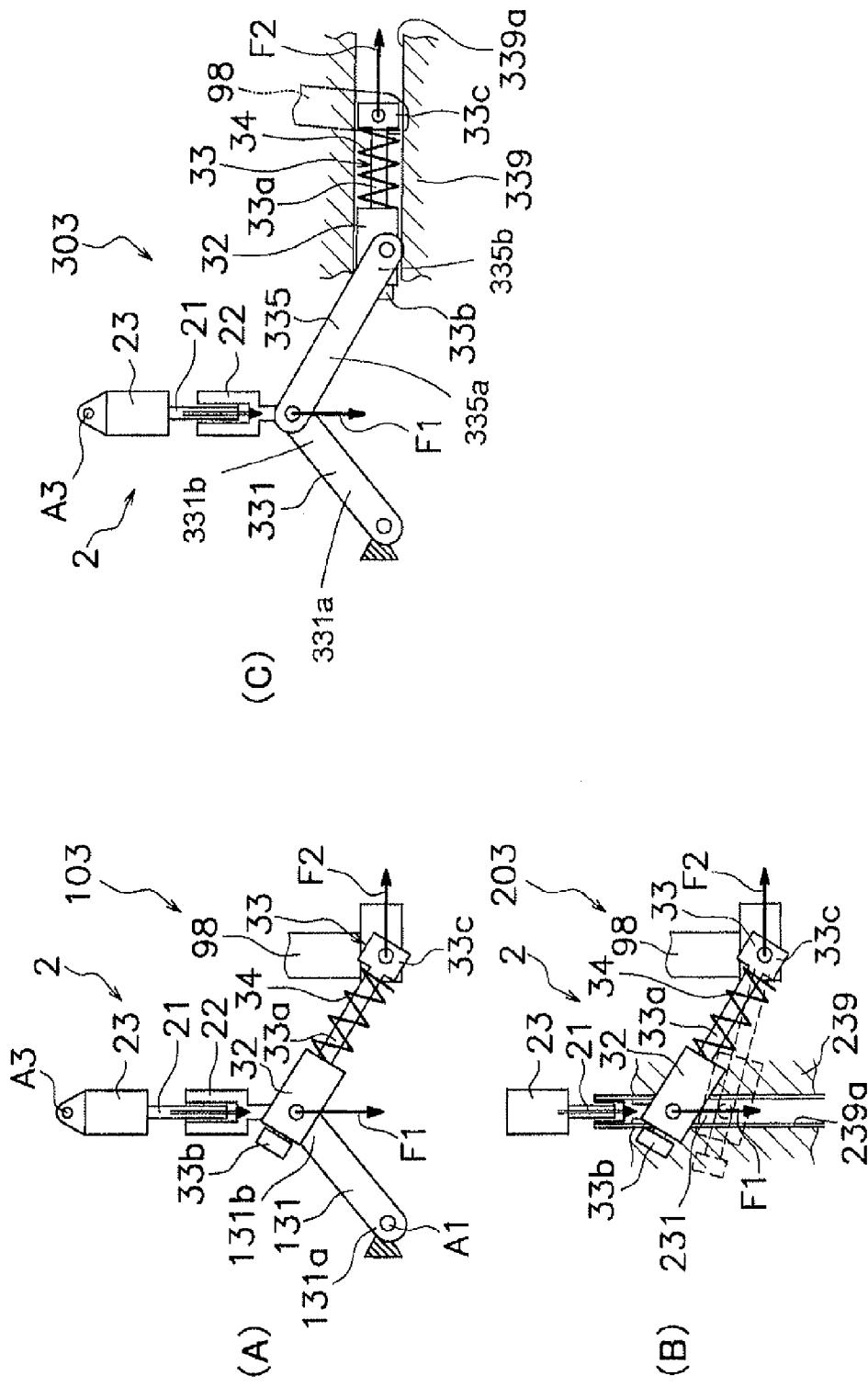
FIG. 7 includes structural diagrams (A) to (C) of reduction mechanisms (other exemplary embodiments).

As illustrated in FIG. 7(A), a reduction mechanism 103 of a first modification applies the principle of a toggle mechanism, and includes a first link member 131, the second link member 32, the third link member 33 and the coil spring 34. A first end 131a of the first link member 131 is rotatably coupled to a housing (not illustrated in the figures). A second end 131b of the first link member 131 is rotatably coupled to the second link member 32. The second link member 32 is downwardly pressed by the drive mechanism 2. Specifically, the ball screw 22 is coupled to the second end 131b and the second link member 32. The drive motor 23 of the drive mechanism 2 is supported by the housing (not illustrated in the figures) while being rotatable about a rotary axis A3. The coil spring 34 is disposed in a compressed state between the second link member 32 and the third link member 33. The coupling portion 33c of the third link member 33 is coupled to the clutch lever 98.

When the second link member 32 is downwardly pressed by the drive mechanism 2, the clutch lever 98 is pressed by the third link member 33. At this time, the driving force F1 is amplified to the operating force F2 by the reduction mechanism 103. Further, also in the case of the first modification, similarly to the aforementioned exemplary embodiment, the compressed state of the coil spring 34 is changed in accordance with the operating force F2 and the stroke S, and the reduction ratio of the reduction mechanism 103 is automatically adjusted. Therefore, it is possible to achieve advantageous effects similar to those achieved by the aforementioned exemplary embodiment.

As illustrated in FIG. 7(B), a reduction mechanism 203 of a second modification applies the principle of a toggle mechanism, and includes a slide member 231, the second link member 32, the third link member 33, and the coil spring 34. The slide member 231 is movably supported by a guide member 239 fixed to a housing (not illustrated in the figures). Specifically, the slide member 231 is inserted into a guide groove 239a of the guide member 239. The slide member 231 is rotatably coupled to the second link member 32. Further, the slide member 231 is downwardly pressed by the drive mechanism 2. The coil spring 34 is disposed in a compressed state between the second link member 32 and the third link member 33. The coupling portion 33c of the third link member 33 is coupled to the clutch lever 98.

When the second link member 32 is downwardly pressed by the drive mechanism 2, the clutch lever 98 is pressed by the third link member 33. At this time, the driving force F1 is amplified to the operating force F2 by the reduction mechanism 203. Further, also in the case of the second modification, similarly to the aforementioned exemplary embodiment, the compressed state of the coil spring 34 is changed in accordance with the operating force F2 and the stroke S, and the reduction ratio of the reduction mechanism 203 is automatically adjusted. Therefore, it is possible to achieve advantageous effects similar to those achieved by the aforementioned exemplary embodiment.

Further, as illustrated in FIG. 7(C), a reduction mechanism 303 of a third modification applies the principle of a toggle mechanism, and includes a first link member 331, the second link member 32, the third link member 33, the coil spring 34 and an intermediate link member 335. A first end 331a of the first link member 331 is rotatably coupled to a housing (not illustrated in the figures). A second end 331b of the first link member 331 is rotatably coupled to the intermediate link member 335.

A first end 335a of the intermediate link member 335 is rotatably coupled to the first link member 331. The first end 335a is downwardly pressed by the drive mechanism 2. A second end 335b of the intermediate link member 335 is rotatably coupled to the second link member 32. The second link member 32 and the third link member 33 are movably supported by a guide member 339 fixed to the housing (not illustrated in the figures). Specifically, the second link member 32 and the third link member 33 are inserted into a guide groove 339a of the guide member 339. The coupling portion 33c of the third link member 33 is coupled to the clutch lever 98. The drive motor 23 of the drive mechanism 2 is supported by the housing (not illustrated in the figures) while being rotatable about the rotary axis A3.

When the first end 335a of the intermediate link member 335 is downwardly pressed by the drive mechanism 2, the second link member 32 is pressed along the guide groove 339a and the clutch lever 98 is pressed by the third link member 33. At this time, the driving force F1 is amplified to the operating force F2 by the reduction mechanism 203. Further, also in the third modification, similarly to the aforementioned exemplary embodiment, the compressed state of the coil spring 34 is changed in accordance with the operating force F2 and the stroke S, and the reducing ratio of the reduction mechanism 203 is automatically adjusted. Therefore, it is possible to achieve advantageous effects similar to those achieved by the aforementioned exemplary embodiment.

It should be noted that the coil spring 34 has been exemplified for explaining the elastic member, but any other element can be used as the elastic member used for the reduction part as long as it is a member that can generate elastic force.

(D) The clutch lever 98 can be omitted. In this case, a structure can be considered that the third link member 33 directly presses the engaging bearing 97. Contrarily, other mechanism can be disposed between the clutch lever 98 and the reduction mechanism 3. For example, a slave cylinder and a master cylinder can be disposed between the clutch lever 98 and the drive mechanism 2.

INDUSTRIAL APPLICABILITY

According to the clutch operating device explained above, it is possible to reduce increase in load attributed to individual differences among clutch device products. Therefore, the technique herein disclosed is useful in the field of the drive devices.

The invention claimed is:

1. A clutch operating device for operating a clutch device, comprising:
   a drive part configured to generate a driving force; and
   a reduction part configured to amplify the driving force by reducing a driving amount inputted thereto from the drive part and convert the amplified driving force into an operating force of the clutch device, the reduction part having a reduction ratio characteristic gradually increasing the clutch device from a power blocking state to a power transmitting state, the reduction part being allowed to adjust the reduction ratio characteristic in accordance with a state of the clutch device,
   the reduction part being configured to start changing the reduction ratio characteristic when the operating force reaches a reference operating force, the reduction part including
      an elastic member disposed on a power transmission path from the driving part to the clutch device,
      a first link member configured to be driven and rotated by the drive part,
      a second link member rotatably coupled to the first link member, and
      a third link member disposed movably with respect to the second link member, the third link member coupled to the clutch device,
   the elastic member being configured to determine the reference operating force, and the elastic member being disposed in a preliminarily compressed state between the second link member and the third link member.

2. The clutch operating device recited in claim 1, wherein the reduction part is allowed to automatically adjust the reduction ratio characteristic in accordance with a relation between the operating force and the driving amount.

3. The clutch operating device recited in claim 1, wherein the reference operating force is changed in accordance with the driving amount.

4. The clutch operating device recited in claim 1, wherein
the elastic member is disposed in a preliminarily compressed state,
the elastic member is configured to start being compressed when a load thereon exceeds an initial compression load, and
the reference operating force is determined by the initial compression load.

5. The clutch operating device recited in claim 1, wherein
the second link member has a slide aperture,
the third link member includes
   a shaft part inserted into the slide aperture,
   a stopper part formed on a first end of the shaft part, wherein the stopper part includes a contour greater than the slide aperture, and
   a coupling part disposed on a second end of the shaft part, wherein the coupling part is rotatably coupled to the clutch device, and
the elastic member is preliminarily compressed between the second link member and the coupling part.

6. The clutch operating device recited in claim 1, wherein
the reduction part is configured to realize the first reduction ratio characteristic when the clutch device is in an initial state, and
the reduction part is configured to realize a second reduction ratio characteristic with a reduction ratio greater than a reduction ratio of the first reduction ratio characteristic when the clutch device is in an abraded state.

* * * * *